United States Patent Office 3,310,550
Patented Mar. 21, 1967

3,310,550
WATER-INSOLUBLE DISAZO DYES
Hans Wilhelm Liechti, Oberwil, Basel-Land, Switzerland, assignor to Ciba Limited, Basel, Switzerland, a Swiss company
No Drawing. Filed Oct. 30, 1963, Ser. No. 319,977
Claims priority, application Switzerland, Jan. 30, 1961, 1,069/61; Dec. 11, 1961, 14,356/61
6 Claims. (Cl. 260—152)

This is a continuation-in-part of our application Ser. No. 168,536 filed Jan. 24, 1962, and now abandoned.

The present invention provides new disazo dyes free from acidic water-solublizing groups, especially sulfonic acid and carboxylic acid groups, the dyes having the general formula (1)         A—N=N—B—N=N—D in which A represents a benzene radical containing a lower alkylsulfonyl, halogenmethylsulfuryl, arylsulfonyl, aralkylsulfonyl, arylsulfonylalkyl, aroxysulfonyl or a sulfonamide group of the formula (2) 

in which $R_1$ is an alkyl radical and $R_2$ is an alkyl, cycloalkyl or benzene radical, $R_1$ and $R_2$ also being capable of forming a heterocyclic ring with the nitrogen atom, in which B is a benzene or naphthalene radical in which the azo groups are in 1,4-position to one another, and in which D is a benzene radical which has a hydroxy group in p-position to the azo group.

The new compounds may be obtained by coupling the diazo compound of an amino azo dye of the formula (3)         A—N=N—B—NH₂ in which A has the meaning described under Formula 1 and B is a benzene or naphthalene radical in which the amino and azo groups are in p-position to one another, with an hydroxy benzene which couples at p-position to the hydroxy group.

These disazo dyestuffs correspond to the formula

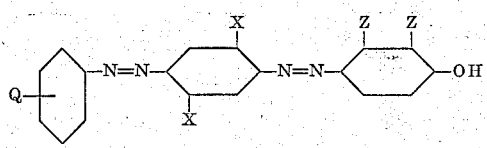

in which Q represents a member selected from the group consisting of lower alkylsulfonyl, chloromethylsulfonyl, phenylsulfonyl, phenylalkylsulfonyl, phenylsulfonylalkyl, phenoxysulfonyl and a sulfonamide of the formula

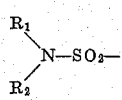

in which $R_1$ is lower alkyl and $R_2$ represents a member selected from the group consisting of cycloalkyl and phenyl, and in which $R_1$ and $R_2$ may form together with the nitrogen atom heterocyclic nuclei which are members selected from the group consisting of pyrrolidide, piperidide and morpholide and the one X represents a member selected from the group consisting of a hydrogen atom, a chlorine atom, a lower alkyl and a lower alkoxy group, and the other X represents a member selected from the group consisting of lower alkyl and lower alkoxy, one Z is a hydrogen atom and the other Z represents a member selected from the group consisting of a hydrogen atom, a chlorine atom alkyl and alkoxy, wherein the residue Q is bound in meta-position and para-position with respect to the azo linkage.

Compounds which are of special interest as diazo components are those amino azo dyes of Formula 3 in which the radical B corresponds to the formula (4) 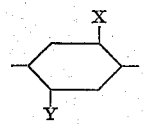

in which one X is a hydrogen or halogen atom, an alkyl or alkoxy group, and the other X is an alkyl or alkoxy group.

The dyes of Formula 3 can be obtained by coupling a diazotized aminobenzene containing an alkylsulfonyl, arylsulfonyl, aralkylsulfonyl, arylsulfonylalkyl, aroxysulfonyl or sulfonamide group of Formula 2 with an aminobenzene or aminonaphthalene free from water-solubilizing, acidic groups serving as middle component.

The most suitable starting components are those aminobenzenes in which the sulfonyl, aroxysulfonyl, or sulfonamide group present in the radical A according to Formula 1 is in p- or m-position to the amino group. These aminobenzenes can have further substituents in the benzene nucleus or in the alkylsulfonyl radicals, for example halogen atoms such as chlorine or bromine, alkoxy alkyl, nitro or cyano groups; the alkyl or aryl radicals of the sulfonic or sulfonamide groups can also be substituted by the atoms and groups mentioned. Examples are 1-amino-4-methylsulfonylbenzene,
1-amino-4-ethylsulfonylbenzene,
1-amino-4-chloromethylsulfonylbenzene,
1-amino-4-β-cyanoethylsulfonylbenzene,
1-amino-4-phenylsulfonylbenzene,
1-amino-4-benzylsulfonylbenzene,
4-aminobenzyl-phenylsulfone,
1-amino-3-methylsulfonylbenzene,
1-amino-3-ethylsulfonylbenzene,
1-amino-2-bromo-4-methylsulfonylbenzene,
1-amino-2-chloro-4-methylsulfonylbenzene,
1-amino-4-chloro-2-methylsulfonylbenzene,
1-amino-2-cyano-4-methylsulfonylbenzene,
1-amino-4-cyano-2-methylsulfonylbenzene,
1-amino-4-nitro-2-methylsulfonylbenzene,
4-aminobenzenesulfonic acid phenylester,
1-aminobenzene-4-dimethylsulfonamide,
1-aminobenzene-4-diethylsulfonamide,
1-aminobenzene-4-(N-ethyl-N-methyl)-sulfonamide,
1-aminobenzene-4-sulfonic acid piperidide,
1-aminobenzene-4-sulfonic acid morpholide,
1-aminobenzene-4-sulfonic acid pyrrolidide,
1-aminobenzene-4-sulfonic acid phenyl-methylamide
1-aminobenzene-4-sulfonic acid N-methylcyclohexylamide.

As middle components there may be mentioned for example: aminonaphthalenes such, for example, as 1-aminonaphthalene or 1-amino-5- or 8-chloronaphthalene, advantageously however, aminobenzenes which have at least one further substituent in the benzene nucleus, especially those of the formula (5) 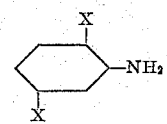

where one X is a hydrogen or halogen atom, an alkyl or alkoxy group, and the other X is an alkyl or alkoxy group.

As examples there may be mentioned:

1-amino-2- or -3-methyl-benzene,
1-amino-2- or -3-methoxybenzene,
1-amino-2- or -3-ethoxybenzene,
1-amino-2- or -3-chlorobenzene,
1-amino-2:5-dimethylbenzene,
1-amino-2:5-dimethoxybenzene,
1-amino-2-methoxy-5-methylbenzene,
1-amino-2-ethoxy-5-methylbenzene.

Coupling is suitably carried out in a weakly acid or weakly alkaline medium, for example, a medium acidified with acetic acid or made alkaline with bicarbonate. If the middle components have only low coupling power they are best coupled in the form of their ω-methanesulfonic acids, the ω-methanesulfonic acid group being split off afterwards. Diazotizing of the aminoazo dyes of Formula 3 can be carried out according to the usual methods, which are generally known as such; for example with the assistance of hydrochloric acid and sodium nitrite. In accordance with the process, the diazomonoazo compounds thus obtained are coupled with the end components in an alkaline medium, for example, made alkaline with alkali carbonate, using, if necessary, agents which promote coupling such, for example, as pyridine or picoline.

Hydroxybenzenes of the formula

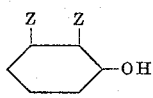

are preferably used as end components, in which formula one Z is a hydrogen atom and the other Z a hydrogen or halogen atom or an alkyl or alkoxy group. As examples there may be mentioned hydroxybenzene, 2- and 3-methyl-1-hydroxybenzene, 2-chloro-1-hydroxybenzene, 2- or 3-methoxy-1-hydroxybenzene, 2:5- or 3:5-dimethyl-1-hydroxybenzene.

The new disazo dyes are eminently suitable for dyeing and printing hydrophobic fiber material made, for example, from cellulose esters and cellulose ethers, superpolyamides and superpolyurethanes, polyvinylchloride and especially fibers made of polyesters, e.g. polyethylene-terephthalates, particularly when they are suitably pasted, which process can also be combined with reprecipitation, e.g. with sulfuric acid. When applied by the usual dyeing processes, for example using a dye liquor containing a dispersion of the dye and preferably a dispersing agent and dyeing either at temperatures close to 100° C., if desired in the presence of a swelling agent, or under pressure at temperature above 100° C., they yield pure and mostly strong yellow to scarlet red shades possessing particularly good fastness to light and to sublimation.

If an union fabric made of a mixture of polyester fibers and wool is dyed with the dyestuffs of the invention, the wool is nearly completely reserved.

A particular attribute of the dyes of the invention is that they can be applied from an alkaline bath in spite of their phenolic hydroxy group. This makes them particularly suitable for application by the so-called thermofix (pad-bake) process in which the fabric to be dyed is impregnated advantageously at a temperature not exceeding 60° C. with an aqueous dispersion of the dye suitably containing 1 to 50% of urea and a thickening agent, especially sodium alginate, the fabric being squeezed in the normal manner. The pressure at the nip is advantageously adjusted to ensure that the cloth retains 50 to 100% by weight of dye liquor, calculated on the dry weight of the cloth.

The dye is fixed by subjecting the impregnated fabric to a heat treatment at temperature above 100° C., for example at temperatures between 180 to 210°, it being advisable to dry the fabric prior to this treatment, for example in a current of warm air.

The thermofix (pad-bake) procedure just mentioned is of special interest for the dyeing of union fabrics made of a mixture of polyester fibers and cellulosic fibers, particularly cotton. In this case, apart from the dye to be used in the process herein described, the padding liquor contains dyes suitable for dyeing cotton, for example vat dyes or, in particular, so-called reactive dyes, i.e. dyes which can be fixed to the cellulosic fiber by formation of a chemical linkage; for example, dyes containing a chlorotrazine or chlorodiazine radical. In the last-mentioned case it has proved of advantage to add to the padding liquor an agent which combines with acid, for example an alkali carbonate, alkali phosphate, alkali borate, or alkali perborate, or a mixture of two or more of these agents. When using vat dyes, the padded fabric has to be treated with an aqueous alkaline solution of a reducing agent normally used in vat dyeing after it has been heat-treated.

Compared with the dyestuffs described in the U.S. Patent No. 2,784,204 (Heyna) the best comparable dyestuffs of the present invention show a much better tinctorial strength. Moreover, they reserve wool in union fabrics made of polyester fibers, and wool, whereas with the known dyestuffs wool is considerably stained.

A much higher concentration of dyestuff in the dyebath is necessary if one of the dyestuffs disclosed in the U.S. Patent No. 2,317,387 (Kvalnes) is used instead of the best comparable dyestuffs of the present invention for dyeing polyester fibers to obtain the same depth in shade.

The following examples illustrate the invention and unless otherwise stated, the parts and percentages are by weight and the temperatures are given in degrees centigrade.

Example 1

17.1 parts of 4-aminophenyl-methylsulfone are diazotized in the usual way and coupled with 10.7 parts of 1-amino-3-methylbenzene in a solution acidified with acetic acid. The resulting dye is isolated, slurried in dilute hydrochloric acid and diazotized with sodium nitrite at 15 to 20°. The diazo compound is coupled at 5 to 10° with a solution of 9.4 parts of phenol in 100 parts of water, 10 parts of a 30% solution of sodium hydroxide, 20 parts of sodium carbonate and 10 parts of sodium acetate. Coupling to the diazo dye takes place immediately. The dye is filtered off, washed with water until it reacts neutral and then dried.

The new water-insoluble dye of the formula

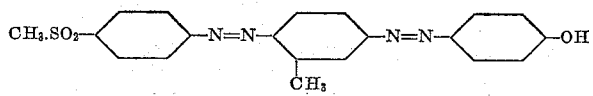

is a brown powder which, in fine dispersion, yields reddish yellow shades of excellent fastness or cellulose acetate rayon, cellulose triacetate rayon and polyamide fibers. Primarily, however, the new dye is capable of producing yellow shades of very good fastness to light and sublimation on polyester fibers when applied from a high temperature acetic acid or alkaline dye bath.

Dyes which dye polyester fibers to the same high degree of fastness can be obtained by using 1-amino-2:5-dimethylbenzene, 1-amino-5-methyl-2-methyloxybenzene or 1-amino-naphthalene as intermediate component instead of 1-amino-3-methylbenzene.

Dyes possessing the same excellent fastness properties can be obtained by using 3-aminophenyl-methylsulfone or 3- or 4-aminophenyl-ethylsulfone as starting component instead of 4-aminophenyl-methylsulfone.

Example 2

20.5 parts of 4-aminophenyl-chloromethylsulfone are diazotized in the usual way and coupled with 15.3 parts of 1-amino-2:5-dimethoxybenzene in a solution acidified with acetic acid. The resulting aminomonoazo dye is separated off, further diazotized, and coupled at 5 to 10° with a solution of 9.4 parts of phenol in 100 parts of water, 10 parts of a 30% solution of sodium hydroxide and 20 parts of sodium carbonate. Coupling to the disazo dye takes place immediately. The dye is filtered off, washed with water until it reacts neutral and is then dried.

The new water-insoluble dye of the formula

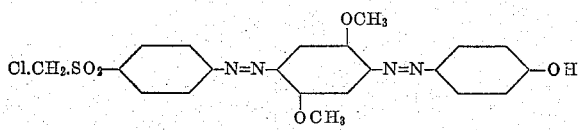

is a brown powder which, in fine dispersion, yields scarlet red shades of excellent fastness on cellulose acetate rayon, cellulose triacetate rayon and polyamide fibers. Primarily, however, the new dye is capable of producing scarlet red shades of good fastness to light and very good fastness to sublimation on polyester fibers when applied from a high temperature acetic acid or alkaline dye bath.

Dyes which dye polyester fibers scarlet red shades to the same high degree of fastness can be obtained by using 1-hydroxy-2- or -3-methyl-benzene or 1-hydroxy-2-chlorobenzene as end component instead of hydroxybenzene.

*Example 3*

20.0 parts of 4-aminobenzenesulfonic acid dimethylamide are diazotized in the usual way and coupled with 10.7 parts of 3-methyl-1-aminobenzene in a solution acidified with acetic acid. The resulting aminomonoazo dye is further diazotized and the diazo compound coupled at 5–10° with 9.4 parts of phenol in a solution made alkaline with sodium carbonate. The disazo dye is formed immediately and is then separated off, washed with water until neutral and then dried.

The new water-insoluble dye of the formula

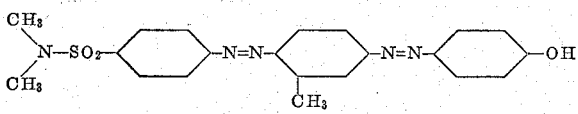

is a brown powder which, in fine dispersion, yields reddish yellow shades of excellent fastness on cellulose acetate rayon, cellulose triacetate rayon and polyamide fibers. Primarily, however, the new dye is capable of producing yellow shades of excellent fastness to light and sublimation on polyester fibers when applied from a high temperature acetic acid or alkaline dye bath.

Dyes possessing the same excellent fastness properties are obtained by using 4-aminobenzenesulfonic acid ethylmethylamide or -4-aminobenzenesulfonic acid phenylmethyl amide as starting component instead of 4-aminobenzenesulfonic acid dimethylamide.

*Example 4*

23.3 parts of 4-amino-diphenylsulfone are diazotized in the usual way and coupled with 10.7 parts of 3-methyl-1-aminobenzene in a solution acidified with acetic acid. The resulting aminomonoazo dye is further diazotized and the diazo compound coupled at 5 to 10° with 9.4 parts of phenol in a solution made alkaline with sodium carbonate. The disazo dye is formed immediately, separated off, washed with water until it reacts neutral and then dried.

The new water-insoluble dye of the formula

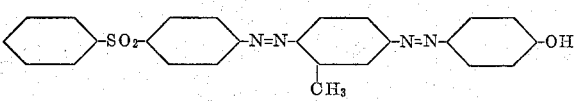

is a brown powder which, in fine dispersion, yields reddish yellow shades of excellent fastness on cellulose acetate rayon, cellulose triacetate rayon and polyamide fibers. Primarily, however, the new dye is capable of producing yellow shades of excellent fastness to light and sublimation on polyester fibers when applied from a high temperature acetic acid or alkaline dye bath.

Dyes possessing the same excellent fastness properties are obtained by using 4-aminophenyl-benzylsulfone or 4-amino-benzylphenylsulfone as starting material instead of 4-amino-diphenylsulfone.

*Example 5*

24.2 parts of 4-aminobenzene-sulfonic acid-morpholide are diazotized in the usual way and coupled with 10.7 parts of 3-methyl-1-aminobenzene in a solution acidified with acetic acid. The resulting aminomonoazo dye is further diazotized and the diazo compound coupled at 5–10° with 9.4 parts of phenol in a solution made alkaline with sodium carbonate. The disazo dye is formed immediately, separated off, washed with water until neutral and then dried.

The new water-insoluble dye of the formula

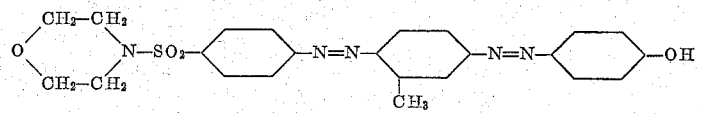

is a brown powder which, in fine dispersion, yields reddish yellow shades of excellent fastness on cellulose acetate rayon, cellulose triacetate rayon and polyamide fibers. Primarily, however, the new dye is capable of producing yellow shades of excellent fastness on polyester fibers when applied from a high temperature acetic acid or alkaline dye bath.

Dyes possessing the same excellent fastness properties are obtained by using 4-aminobenzenesulfonic acid piperidide or 4-aminobenzenesulfonic acid pyrrolidide as starting component instead of 4-aminobenzene sulfonic acid morpholide.

*Example 6*

24.9 parts of 4-aminobenzenesulfonic acid-phenyl ester are diazotized in the usual way and coupled with 10.7 parts of 3-methyl-1-aminobenzene in a solution acidified with acetic acid. The resulting aminomonoazo dye is isolated and further diazotized. The diazo compound is coupled at 5–10° with 9.4 parts of phenol in a solution made alkaline with sodium carbonate. The dye is formed immediately, separated off, washed with water until neutral and then dried.

The new water-insoluble dye of the formula

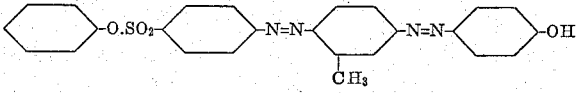

is a brown powder which, in fine dispersion, yields reddish yellow shades of excellent fastness on cellulose acetate rayon, cellulose triacetate rayon and polyamide fibers. Of prime importance, however, is the fact that the new dye is capable of producing yellow shades of excellent fastness to light and sublimation on polyester fibers when applied from a high temperature acetic acid or alkaline dye bath.

Dyes which dye polyester fibers to the same high degree of fastness are obtained by using 2:5-dimethyl-1-aminobenzene or 2-methoxy-5-methyl-1-aminobenzene as middle component instead of 3-methyl-1-aminobenzene.

*Example 7*

1 part of the dye produced according to Example 1 is milled wet with 2 parts of a 50% aqueous solution of sulfite cellulose waste liquor and dried.

This dye preparation is stirred together with 40 parts of a 10% aqueous solution of a condensation product of octadecylalcohol with 20 mols of ethylene oxide, and 4 parts of a 40% solution of acetic acid added. A dyebath of 4000 parts is prepared by diluting with water.

100 parts of washed polyester fiber material is entered into this deybath at 50°, the temperature raised to 120 to 130° in half an hour, and dyeing continued in a closed vessel at this temperature for 1 hour. The material is then well rinsed. A strong bright yellow dyeing of very good fastness to light and sublimation is obtained.

*Example 8*

1 part of a dye produced according to Example 1 is milled wet with 2 parts of a 50% aqueous solution of sulfite cellulose waste liquor and dried.

This dye preparation is stirred together with 40 parts of a 10% aqueous solution of a condensation product of octadecylalcohol with 20 mols of ethylene oxide, and 4 parts of trisodium phosphate added. A dyebath of 4000 parts is prepared by diluting with water.

100 parts of washed polyester fiber material is entered into this dyebath at 50°, the temperature raised to 120° to 130° within ½ hour and dyeing continued for 1 hour at this temperature in a closed vessel. The material is then well rinsed. A strong, bright yellow dyeing is obtained which corresponds exactly to that of Example 7 in respect of strength, shade and all fastness properties.

A similar dyeing is obtined when a concentrated dye dispersion in the presence of a thickening, e.g. an alginate, is either padded or printed on to a polyester fabric, or, after intermediate drying, is fixed on the fiber by a short heat treatment at about 220° (thermosol process).

*Example 9*

100 parts of washed polyester fiber material are entered at 50° into a dyebath made up of 12 parts of diammonium phosphate with 40 parts of a 10% aqueous solution of a condensation product of octadecylalcohol with 20 mols of ethylene oxide in 4000 parts of water and treated therein for 15 minutes. After this period, a solution of 12 parts of o-phenylphenol in a dilute solution of sodium hydroxide is added and treatment continued for a further 15 minutes at 50 to 55°.

A fine dispersion of 1 part of the dye produced according to Example 3 in 2 parts of a 50% aqueous solution of sulfite cellulose waste liquor is then added and the temperature raised to the boil within half an hour. Dyeing is then continued at the boil for 1½ to 2 hours.

The dyed material is then treated for 30 minutes at 60 to 70° in a bath made up of 2 parts of a 30% solution of sodium hydroxide and 10 parts of a 10% aqueous solution of a condensation product of octadecyl alcohol with 2 mols of ethylene oxide in 100 parts of water. It is then well rinsed. A strong, bright yellow dyeing of very good fastness to light and sublimation is obtained.

What is claimed is:

1. Disazo dyestuffs which correspond to the formula

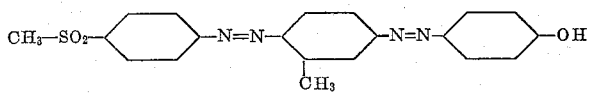

in which Q represents a member selected from the group consisting of lower alkylsulfonyl, chloromethylsulfonyl, phenylsulfonyl, phenylmethylsulfonyl, phenoxysulfonyl and a sulfonamide of the formula $$\begin{array}{c} R_1 \\ \diagdown \\ N-SO_2- \\ \diagup \\ R_2 \end{array}$$

in which $R_1$ is lower alkyl and $R_2$ represents a member selected from the group consisting of cyclohexyl and phenyl, and in which $R_1$ and $R_2$ may form together with the nitrogen atom heterocyclic nuclei which are members selected from the group consisting of pyrrolidide, piperidide and morpholide and the one X represents a member selected from the group consisting of a hydrogen atom, a chlorine atom, a lower alkyl and a lower alkoxy group, and the other X represents a member selected from the group consisting of lower alkyl and lower alkoxy, one Z is a hydrogen atom and the other Z represents a member selected from the group consisting of a hydrogen atom, a chlorine atom, lower alkyl and lower alkoxy wherein the residue Q is bound in meta-position or para-position with respect to the azo linkage.

2. The dyestuff of the formula

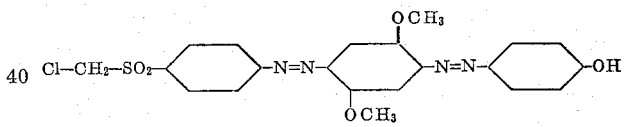

3. The dyestuff of the formula

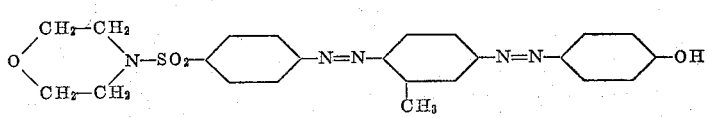

4. The dyestuff of the formula

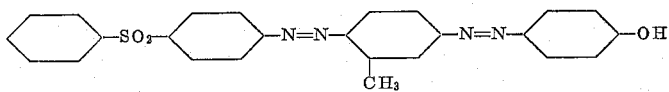

5. The dyestuff of the formula

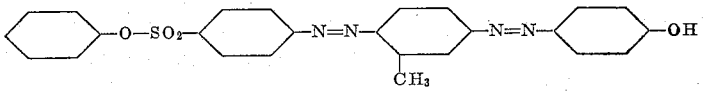

6. The dyestuff of the formula

References Cited by the Examiner

UNITED STATES PATENTS 2,317,387  4/1943  Kvalnes et al. ____ 260—186 XR
2,784,204  3/1957  Heyna et al. ____ 260—186 XR

FOREIGN PATENTS 776,288  6/1957  Great Britain.

OTHER REFERENCES

Derwent, Belgian Reports, vol. 1, No. 1, pages A7–A8, July 1961.

CHARLES B. PARKER, *Primary Examiner.*

D. M. PAPUGA, R. J. FINNEGAN, *Assistant Examiners.*